Jan. 16, 1940.  E. M. BRIGHT  2,187,193
STEERING WHEEL
Filed May 17, 1937  3 Sheets-Sheet 1

INVENTOR.
ELVIN M. BRIGHT
BY
ATTORNEY.

Jan. 16, 1940.   E. M. BRIGHT   2,187,193
STEERING WHEEL
Filed May 17, 1937   3 Sheets-Sheet 2

INVENTOR.
ELVIN M. BRIGHT
BY
ATTORNEY.

Jan. 16, 1940.   E. M. BRIGHT   2,187,193
STEERING WHEEL
Filed May 17, 1937   3 Sheets-Sheet 3

INVENTOR.
ELVIN M. BRIGHT
BY
ATTORNEY.

Patented Jan. 16, 1940

2,187,193

UNITED STATES PATENT OFFICE 2,187,193

STEERING WHEEL

Elvin M. Bright, Dayton, Ohio, assignor to John M. Wallace, Cincinnati, Ohio, as trustee Application May 17, 1937, Serial No. 143,140

9 Claims. (Cl. 74—552)

This invention relates to a steering wheel and in more particular to a steering wheel of the "Banjo" type.

Several makes of steering wheels provide for a hub attached to a hand gripping rim by spoke-like groups of radially disposed wire-like members.

An object of this invention is to provide a steering wheel having a pair of spoke-like groups of wire members disposed intermediate the rim and the hub, arranged in offset relation with respect to the diameter of the wheel.

Another object of this invention is to provide a steering wheel having the spokes offset with respect to the center of the hub.

Another object of this invention is to provide a steering wheel that is easily constructed, cheap, but at the same time strong and durable, presenting a neat appearance.

Another object of this invention is to provide a hub cap which may function as a push button for the horn, that is provided with a plurality of arcuate bands terminating in tangential portions each aligned with a respective wire of each group of spoke-like members.

Another object of this invention is to provide a hub cap which may be used as a push button for the horn which is large enough so as to be within finger reach from the steering wheel.

Other objects and advantages reside in the construction of parts, the combination thereof and the mode of operation, as will become more apparent from the following description.

"Banjo" type wheels have been in vogue for some time. These generally consist of radially arranged groups of wire-like members extending from the hub to the rim, there being four, five, six, or seven or any other suitable number of wire-like members in each group. In some of the earlier wheels four or more groups are used. Later developments used three groups. It has been proposed to use two groups; but when two groups of radially disposed spokes are used, the steering wheel is very flimsy and too flexible to meet the exacting demands of commercial steering wheels. It has been found that by offsetting the spokes so that the two groups of spoke-like members are not diametrically disposed, the resulting wheel is much stronger. The effective leverage obtained by this arrangement is far greater than if the spokes were diametrically disposed.

The hub is of a comparatively large diameter as measured with respect to the diameter of the wheel. This permits the pressing of the horn button with the thumb without releasing the fingers from the rim. The horn button is within finger reach of the rim, thereby permitting the driver to press the horn button without running the risk of losing control of the car.

Figure 1:
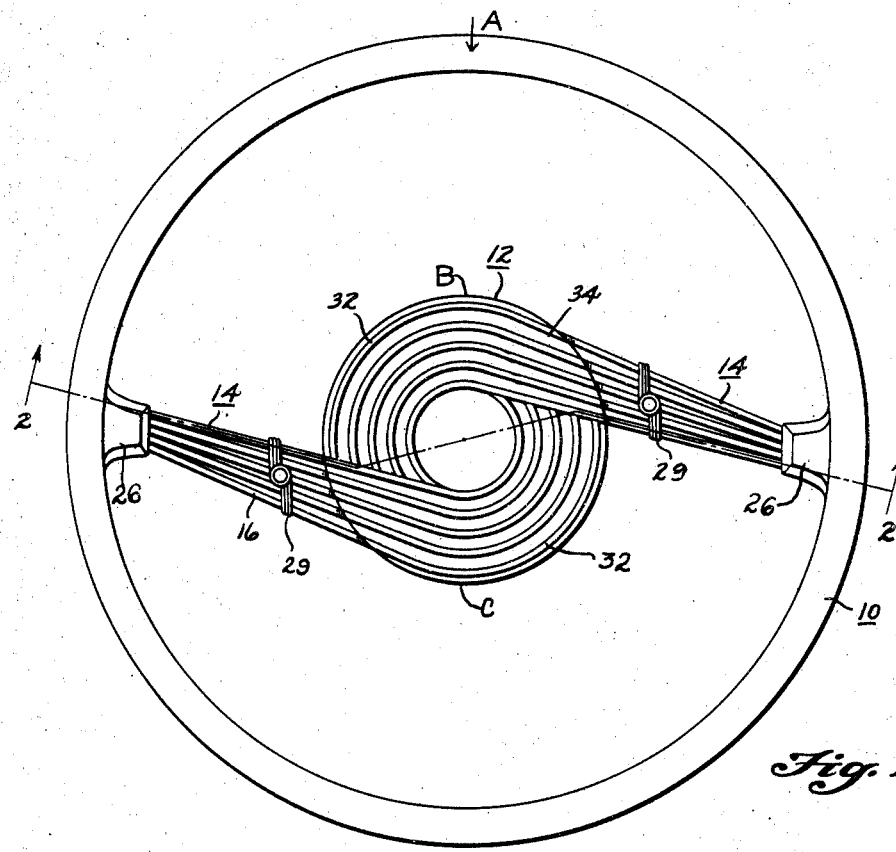
Fig. 1 is a top plan view of the preferred embodiment.
Figure 2:
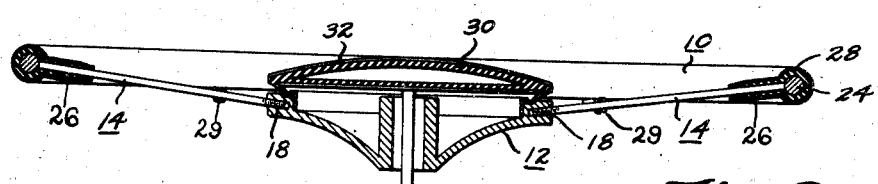
Fig. 2 shows a cross sectional view taken substantially on the line 2—2 of Fig. 1.
Figure 3:
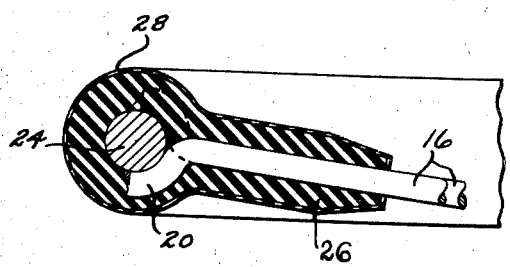
Fig. 3 is an enlarged fragmentary cross sectional view of the rim portion.

The details of the steering wheel will now be described. In the drawings the reference character 10 indicates a hand engaging rim portion held in fixed spaced relation from a hub portion 12 by a plurality of groups of spoke-like members 14. The groups of spokes 14 include a plurality of wire-like members 16 fixedly attached to the hub portion 12 either by welding or threadedly engaging the rim thereof, as shown in Fig. 2 at 18. Each of the wire-like members is either substantially tangentially disposed with respect to the hub, or forms an acute angle with the tangent extending from the juncture of the spoke-like member to the hub. The outer end of each spoke-like member, as best seen in Fig. 3, terminates in an arcuate portion 20 welded to a metallic reenforcing ring or annular core member 24 extending throughout the entirety of the rim portion 10.

After the spokes have been fixedly attached to the hub 12 and welded or otherwise secured to the annular member 24, a plastic molding material, such as sulphur fused with quartz, subsequently intermixed with asphalt containing suitable filler material such as fibers, is molded about the core 24. This may be molded in a cold mold, as more fully described in my copending application Serial No. 92,157 filed July 23, 1936. The outer ends of the spokes 16 are preferably seated in an inwardly projecting boss 26, also molded at the time that the rim is molded and therefore integral therewith. After the molding operation, a suitable coating 28 of nitrocellulose material is applied to the molded rim, which nitrocellulose material contains the desired pigments for the desired colors and at the same time provides a smooth, glossy, tough coating, or covering, for the rim. The nitrocellulose material may be applied by the process disclosed in my copending application Serial No. 92,156 filed July 23, 1936.

In order to steady the spokes and eliminate vibrations therein, a suitable band 29, preferably adjustably mounted, is secured upon the spokes so as to support the same. This helps give the structure rigidity. The arrangement of the groups of spokes 14, being offset from the center of the hub, results in a stronger wheel assembly than if the spokes were radially disposed. If a force is applied at A substantially at right angles to the diameter extending from the outer terminal of one group of spoke-like members to the outer terminal of the other group of spoke-like members, the stresses set up in each spoke will not be purely torsional. They will consist of at least two components, one a torsional, the other a bending action, much the same as a cantilever, or possibly a fixed beam. Each spoke-like member functions in a manner similar to a cantilever fixedly attached to the metallic core 24 or similar to a beam having one end fixedly attached to the metallic core 24 and the other end fixedly attached to the hub portion 12. The ratio of the torsional component to that of the bending or flexing component is dependent inter alia upon the angular relation of each spoke to the tangent extending from the juncture at the hub. The smaller the angle, the larger the flexing or bending component, and vice versa.

The diameter of the hub 12 and the diameter of the rim have a difference less than that required for the hub to be within finger reach from the rim, so that the horn button 30, which is mounted concentrically with the hub, is within reach of the thumb of one hand, without releasing the fingers from the rim. Thus, the horn may be sounded without releasing the steering wheel. The horn button 30 may be attached to the hub or suspended in fixed relation therewith in any suitable manner.

In order to enhance the appearance of the wheel, the horn button 30 is preferably provided with a plurality of arcuate bands 32, each terminating in a tangential portion 34, each aligned with a wire spoke-like member 16. If, for example, the spokes are chromium plated, the bands 32 and the tangential portions 34 may consist of chrome plated stripes so as to give the appearance of the spokes being wrapped around a portion of the hub. The arcuate portions corresponding to one group of spokes terminate in contact with a tangential portion cooperating with the other group of spokes.

Figure 4:
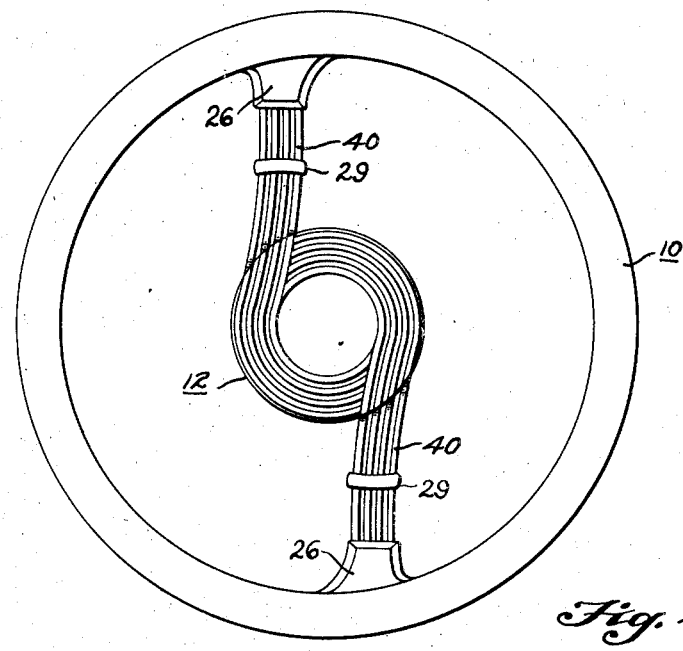
Fig. 4 is a plan view of another modification.

In the modification disclosed in Fig. 4, the rim portion 10 is arranged in fixed spaced relation with respect to the hub portion 12 by a pair of groups of spoke-like members 40 that also are offset with respect to the center of the hub; but instead of being tangentially disposed, are slightly arcuate. The ends of the spokes may be attached in the same manner as that already described.

Figure 5:
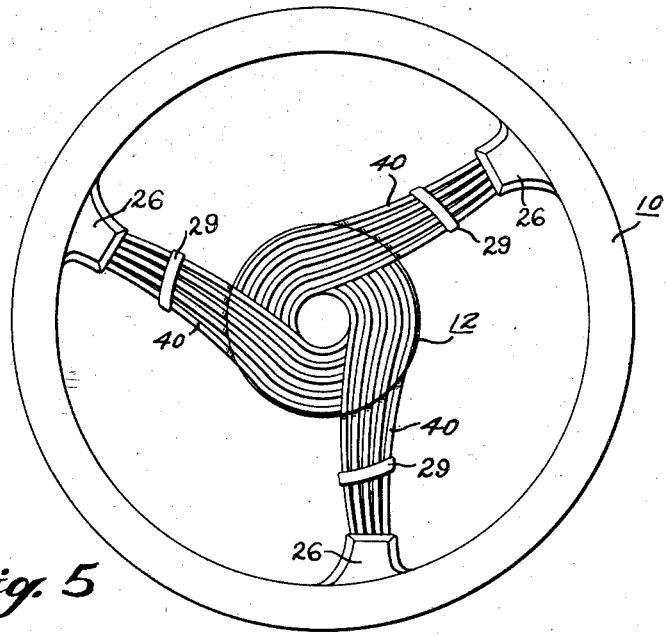
Fig. 5 is a plan view of another modification wherein three groups of spokes are used.

In the modification disclosed in Fig. 5 a plurality of groups of spoke-like members have been used, each group being offset with respect to the center of the hub and substantially tangentially disposed to portions thereof to support the rim portion 10.

Figure 6:
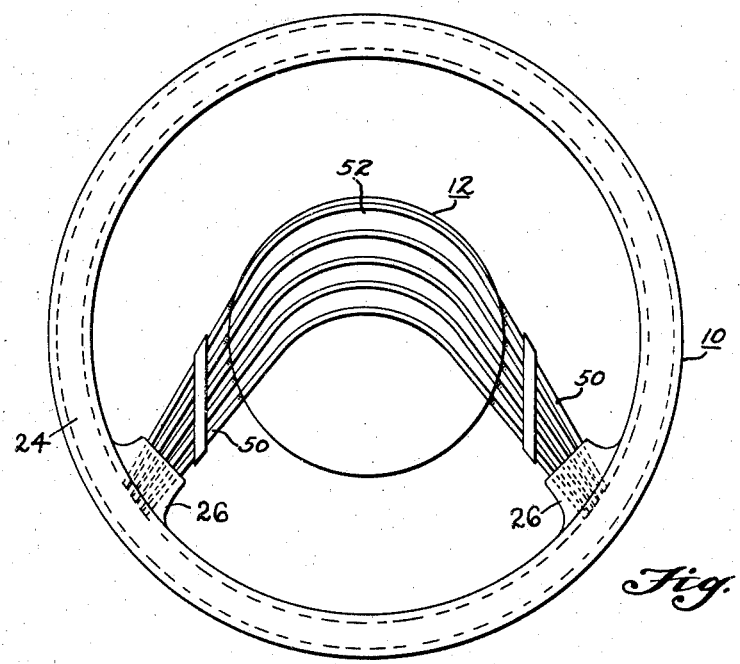
Fig. 6 is another modification wherein symmetry about the vertical plane as shown has been maintained.

In the modification disclosed in Fig. 6, the rim portion 10 is held in fixed spaced relation from the hub portion 12 by a pair of group-like spoke members 50, so arranged that if extended they would intersect. In this modification the arcuate bands 52 found upon the horn button have the opposite ends terminating in tangential portions, one end being aligned with the spokes of one group and the other end being aligned with the spokes of the other group, so as to give the appearance of the spokes extending uninterruptedly from the spokes of one group to the other.

Figure 7:
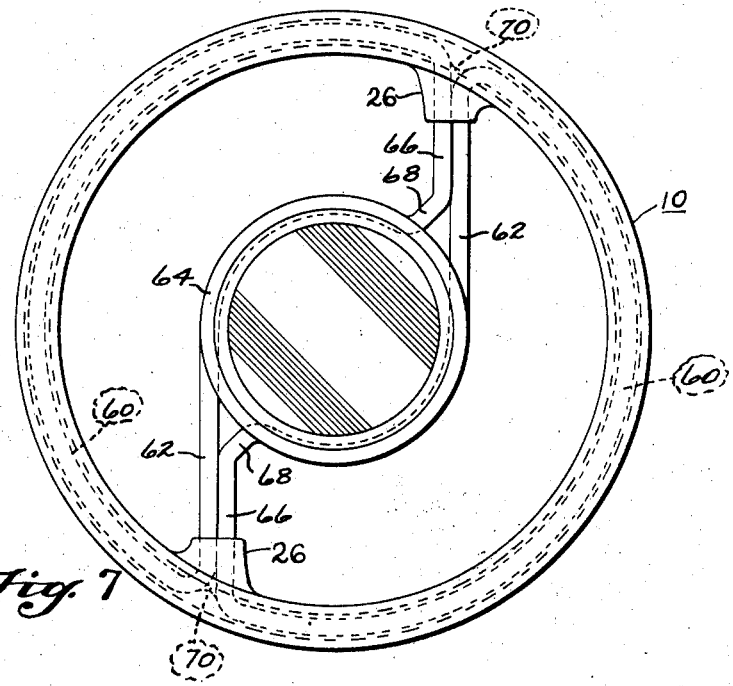
Fig. 7 is another modification.

In the modification disclosed in Fig. 7 the reenforcing core is made from a pair of semi-circular members 60, one end 62 of each extending inwardly and fixedly attached to the hub portion 64, the end 62 being disposed in substantially tangential relation with respect to the hub. The other ends 66 of the semi-circular members also extend inwardly but are curved at 68 shortly before merging into the hub portion 64. The end portions 62 and 66 may be welded or otherwise suitably attached to the hub 64. The two semicircular reenforcing core members 60 are preferably welded at 70 so as to form a rigid, unitary, reenforcing core member for the rim.

Although the preferred modification of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claims.

Having thus described my invention, I claim:

1. In a steering wheel assembly having a hand engaging rim portion and a supporting hub portion, the combination including a pair of groups of spoke-like members dividing the space between the rim and the hub into equal open spaces, so that the open spaces on each side of each group are equal, each group consisting of a plurality of wire-like members offset with respect to the diameter of the wheel, one group of wire-like members being disposed on one side of a common diameter substantially parallel thereto, and the other group being disposed on the opposite side thereof.

2. In a steering wheel assembly having a hand engaging rim portion and a supporting hub portion, the combination including a pair of groups of spoke-like members, each group consisting of a plurality of wire-like arcuate members offset with respect to the diameter of the wheel, one group of wire-like members being disposed on one side of a common diameter extending from the outer end of one group of spokes to the outer end of the opposite group of spokes, the other group being disposed on the opposite side thereof.

3. In a steering wheel assembly having a hand engaging rim portion and a supporting hub portion, the combination including a plurality of spoke-like members dividing the space between the rim and the hub into equal areas, so that the open areas on both sides of each group are equal, each group consisting of a plurality of wire-like members offset with respect to the radius of the wheel terminating at the outer end of the spoke-like members so that each spoke forms an acute angle with the tangent extending from the intersection of the spokes with the hub portion.

4. In a steering wheel assembly having a hand engaging rim portion and a supporting hub portion, the combination including a pair of groups of spoke-like members, each group consisting of a plurality of wire-like members offset with respect to the radius of the wheel terminating at the terminal of the group, the spokes of one group being arranged so as to intersect the spokes of the other group if extended.

5. A steering wheel assembly for a motor vehicle including a hand engaging rim portion, a hub portion, and means for interconnecting the hub portion to the rim portion at the point of engagement, said means including groups of wire spoke-like members, each group being attached to the rim and extending inwardly side by side in a common plane at an acute angle with the tangent of the rim near the point of engagement.

6. A steering wheel assembly for a motor vehicle including a hand engaging rim portion, a hub portion, and means for interconnecting the hub portion to the rim portion, said means including groups of spoke-like members, the spoke-like members of one group forming an acute angle with the tangent to the rim on one side of the spoke-like members and the other group forming an acute angle with the tangent to the rim on the opposite side.

7. A steering wheel assembly for a motor vehicle including a hand engaging rim portion, a hub portion, and means for interconnecting the hub portion to the rim portion, said means including a pair of groups of wire-like rim supporting members, the wires of each group intersecting a common radius, the ends of the wires of each group being rigidly secured in position.

8. A steering wheel assembly for a motor vehicle including a hand engaging rim portion, a hub portion, and means for interconnecting the hub portion to the rim portion, said means including a pair of groups of wire-like rim supporting members, the wires of each group intersecting a common radius, said wire-like members forming an acute angle with intersecting radius and having one end of each attached to the rim and the other to the hub.

9. A steering wheel assembly for a motor vehicle, including a hand engaging rim portion, a hub portion and means for interconnecting the hub portion to the rim portion at the point of engagement, said means including a pair of groups of wire spoke-like members, each group of wire-like members being attached to the rim and extending side by side in a common plane at an acute angle with the tangent of the rim near the point of engagement.

ELVIN M. BRIGHT.